United States Patent [19]

Sweeney

[11] 4,256,552
[45] Mar. 17, 1981

[54] CHLORINE GENERATOR

[76] Inventor: Charles T. Sweeney, 448 Earle Rd., Hewitt, Tex. 76643

[21] Appl. No.: 92,645

[22] Filed: Nov. 8, 1979

[51] Int. Cl.³ .......................... C25B 1/16; C25B 1/00; C25B 9/00; C02F 1/76
[52] U.S. Cl. ...................................... 204/98; 204/128; 204/256; 204/260; 204/296; 210/169; 210/192; 210/754
[58] Field of Search ............................ 204/128–129, 204/151, 98, 260, 265, 266, 296, 254–258, 268–270; 210/59, 62, 169, 192

[56] References Cited

U.S. PATENT DOCUMENTS

| | | | |
|---|---|---|---|
| 3,223,242 | 12/1965 | Murray | 204/260 X |
| 3,496,077 | 2/1970 | Cooper | 204/98 |
| 3,669,857 | 6/1972 | Kirkham et al. | 204/151 |
| 3,732,157 | 5/1973 | DeWitt | 204/256 X |
| 4,066,519 | 1/1978 | Kadija et al. | 204/254 X |
| 4,097,356 | 6/1978 | Yates | 204/266 X |

Primary Examiner—Howard S. Williams
Assistant Examiner—D. R. Valentine
Attorney, Agent, or Firm—Neal J. Mosley

[57] ABSTRACT

A chlorine generator is disclosed for use in chlorinating water in swimming pools, baths, reservoirs, sewage, etc. The generator is of the type consisting of two sealed compartments separated by an ion-permeable membrane and having a cathode in one compartment and an anode in the other. Hydrogen is evolved from the cathode compartment and chlorine from the anode compartment. In this generator, an electrically neutral or bipolar electrode (one not connected in the anode-cathode circuit) is positioned between the anode and the cathode adjacent to the ion-permeable membrane in the anode compartment. The chlorine generator is characterized by a more rapid start up in generating chlorine and in more rapid and more efficient generation of chlorine with chlorine being released at both the anode and the neutral electrode.

17 Claims, 12 Drawing Figures

CHLORINE GENERATOR

BACKGROUND OF THE INVENTION

1. Field of the Invention

This invention relates to new and useful improvements in electrolytic chlorine generators and to methods of generating chlorine and to systems of apparatus for generating chlorine for chlorinating bodies of water, such as, swimming pools, baths, reservoirs, sewage, etc.

2. Brief Description of the Prior Art

The use of chlorine for disinfecting bodies of water, such as, swimming pools, baths, reservoirs, sewage, etc. is well known. In the past, chlorine has usually been supplied by direct application of chlorine gas from tanks containing the gas under pressure. There have also been a number of attempts to provide chlorine gas on a more limited scale by continuous electrolytic generating equipment.

Lindstaedt U.S. Pat. No. 2,887,444 discloses a system in which a body of water, such as, a swimming pool, is provided with a low concentration of dissolved common salt and a stream of water is removed from the main body and electrolysed to produce chlorine and the chlorine and water stream returned to the main body of water.

Murray U.S. Pat. No. 3,223,242 discloses another type of electrolytic cell for generating chlorine for introduction into a stream of water removed from and introduced back into a swimming pool or other body of water.

Richards U.S. Pat. No. 3,282,823 discloses an electrolytic cell for production of chlorine positioned in-line for introducing chlorine into a stream of water removed from and reintroduced into a swimming pool.

Other chlorinating systems using electrolytic cells for production of chlorine for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857, and Yates U.S. Pat. No. 4,097,356. These electrolytic cells are disclosed in a variety of configurations and most of the cells utilize ion-permeable membranes separating the anode and cathode compartments.

Ion-permeable membrane technology used in electrolytic cells is well developed. Ion-permeable membranes used in electrolytice cells have ranged from asbestos diaphragms to carboxylate resin polymers to perfluorosulfonic acid polymer membranes. The perfluorosulfonic acid membranes were developed by Dupont for use in electrolytic cells.

Dotson U.S. Pat. No. 3,793,163 discloses the use of Dupont perfluorosulfonic acid membranes in electrolytic cells and makes reference to U.S. Pat. Nos. 2,636,851; 3,017,338; 3,560,568; 3,496,077; 2,967,807; 3,282,875 and British Pat. No. 1,184,321 as disclosing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085 and Westerlund U.S. Pat. No. 4,069,128.

Discussion of perfluorosulfonic acid membranes is also discussed in the technical literature, e.g., Dupont Magazine, May-June 1973, pages 22–25 and a paper entitled "Perfluorinated Ion Exchange Membrane" by Grot, Munn and Walmsley, presented to the 141st National Meeting of the Electro-Chemical Society, Houston, Texas, May 7–11, 1972.

The structure of electrodes used in electrolytic cells is set forth in most of the patents listed above. Additionally, the following U.S. Patents disclose particular configurations of anodes or cathodes used in electrolytic cells.

Giacopelli U.S. Pat. No. 3,375,184 discloses an electrolytic cell with controlable multiple electrodes which are flat plates of wedge-shaped configuration.

Ettel U.S. Pat. No. 3,821,097 discloses the use of flat plates in electroplating cells.

Lohrberg U.S. Pat. No. 3,951,767 discloses the use of flat plate electrolytic anodes having grooves along the bottoms thereof for conducting gas bubbles generated in the electrolytic process.

Andreoli U.S. Pat. No. 565,953 discloses electroplating apparatus having a plurality of metal screens which are not connected in the electric circuit and function to plate out the metal being separated by the electrolysis.

SUMMARY OF THE INVENTION

One of the objects of this invention is to provide a new and improved system of chlorination and method of chlorination of bodies of water, such as, swimming pools, baths, reservoirs, sewage, etc., utilizing an electrolytic cell of novel construction.

Another object of this invention is to provide a new and improved electrolytic cell for production of chlorine for chlorination of bodies of water.

Another object of this invention is to provide a new and improved electrolytic cell for the production of chlorine having an arrangement comprising a plurality of anodes, only one of which is electrically connected, which produces chlorine more quickly and with improved efficiency.

Other objects of this invention will become apparent from time to time throughout the specification and the claims as hereinafter related.

The foregoing objects are achieved by use of a chlorine generator of the type consisting of two sealed compartments, separated by ion-permeable membrane, having a cathode in one compartment and an anode in the other compartment. Hydrogen is evolved from the cathode compartment and chlorine from the anode compartment for use in chlorinating bodies of water, such as, swimming pools, baths, reservoirs, sewage, etc. In the improved chlorine generator, an electrically neutral or bipolar electrode (one not connected in the anode-cathode circuit) is positioned between the anode and the cathode adjacent to the ion-permeable membrane in the anode compartment. The electrically neutral electrode is positioned in line between the anode and the cathode. The anode, cathode and electrically neutral or bipolar electrode are preferably flat plate electrodes, although other configurations, such as, cylindrical electrodes may be used. The generator is characterized by a more rapid start up when energized with electricity. The chlorine generator is characterized a more rapid start up in generating chlorine and in more rapid and more efficient generation of chlorine with chlorine being released at both the anode and the neutral electrode.

DESCRIPTION OF THE PREFERRED EMBODIMENTS

Figure 1:
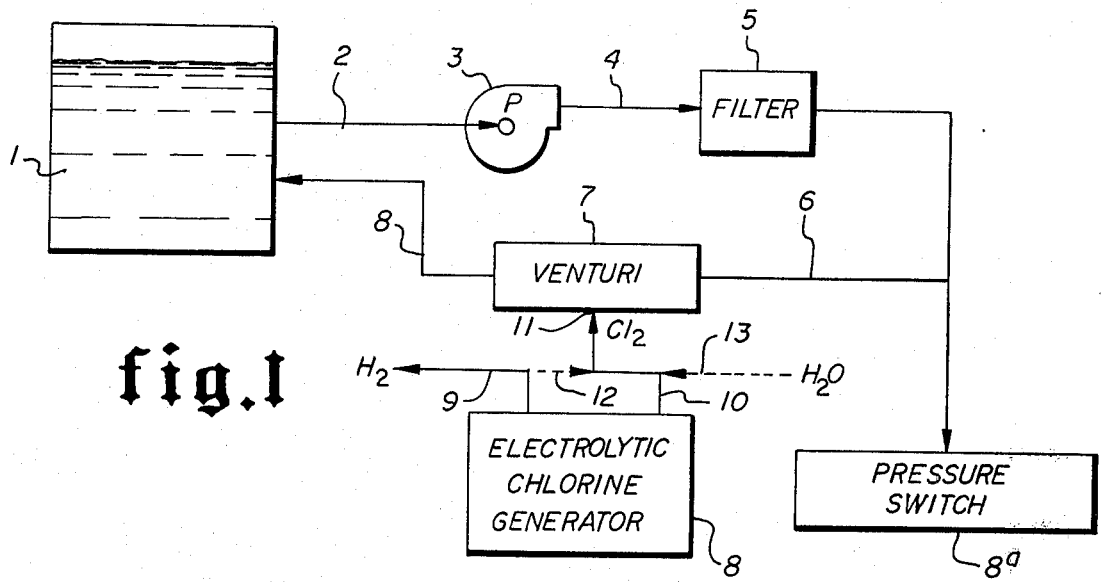
FIG. 1 is a schematic view of a chlorination system for a body of water using an electrolytic chlorine generator.

Referring to the drawings by numerals of reference and more particularly to FIG. 1, there is shown a system for chlorination of a body of water, such as, a swimming pool, bath, reservoir, body of sewage, etc. A body of water 1 is connected by a conduit 2 to a pump 3. The outlet side of pump 3 is connected by conduit 4 to a filter 5. The other side of filter 5 is connected by conduit 6 to the inlet side of the venturi mixer 7, the outlet side of which is connected by conduit 8 back to the body of water 1. The system shown provides for circulation of water from the body of water 1 by pump 3 accompanied by filtration in filter 5 and mixing in venturi mixer 7 before the water is returned to the main body of water 1. The system includes an electrolytic chlorine generator 8 which will be described more fully hereinafter.

Chlorine generator 8 produces hydrogen in the cathode compartment which is discharged as is indicated at 9. The chlorine generator produces chlorine in the anode compartment which is discharged as indicated at 10 and introduced into the venturi mixer 7 as indicated at 11. Optionally, the hydrogen produced in the chlorine generator may be mixed with the chlorine as indicated at 12 and introduced as a mixture into the venturi mixer 7.

Also, the chlorine (optionally including hydrogen) may be mixed with a stream of water as indicated at 13 (also see FIG. 12) for introduction into the venturi mixer 7. The introduction of water as indicated at 13 may be in any conventional conduit system or may be in the form of a water-gas aspirator system in which the flow of water sucks in the chlorine (and optionally hydrogen) gas discharged from chlorine generator 8. Systems of this general type are shown in Lindsteadt U.S. Pat. No. 2,887,444, Murray U.S. Pat. No. 3,223,242 at the Yates U.S. Pat. No. 4,097,356.

The apparatus as shown can be operated in conjunction with conventional timing circuits as in various prior patents cited above and may also be operated in conjunction with switches that are energized simultaneously with the water circulating pump or the chlorine generator may be energized in response to a flow switch or a pressure switch 8a so that it operates whenever water is circulating through the system shown in FIG. 1.

Figure 2:
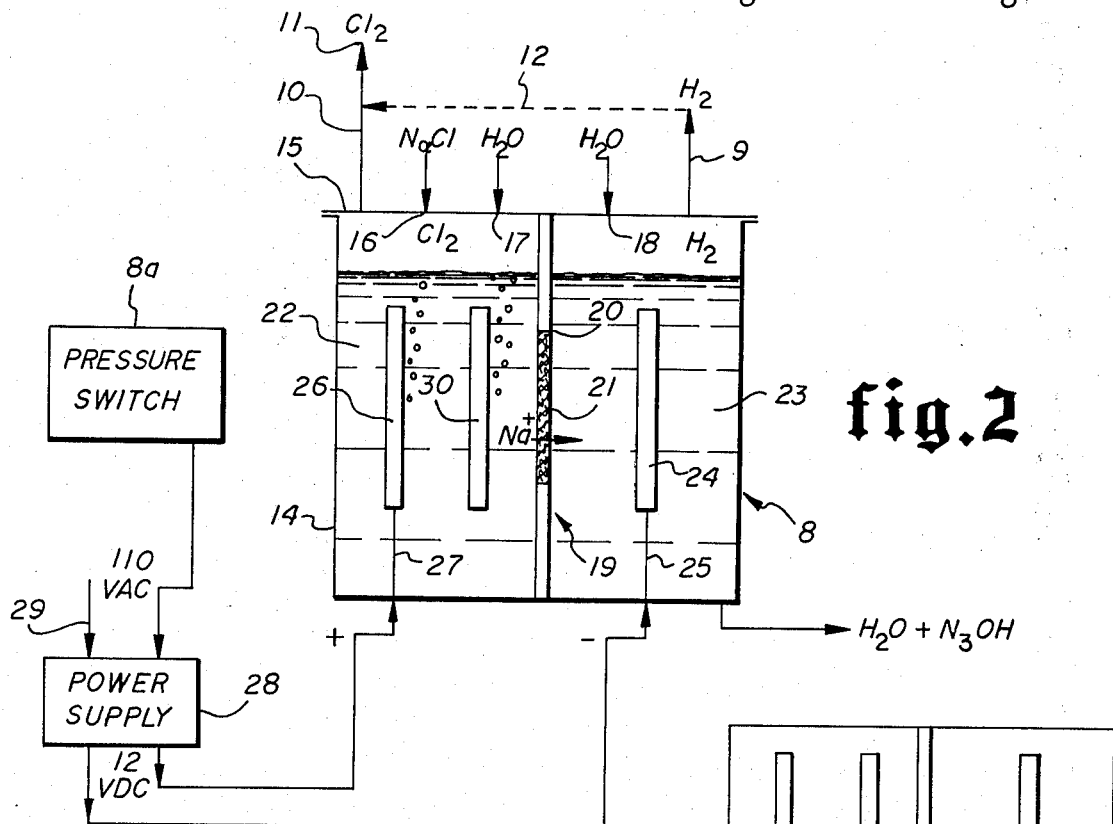
FIG. 2 is a schematic view, in elevation, of a preferred embodiment of the chlorine generator to be used in the system shown in FIG. 1.

The chlorine generator 8, shown schematically in FIG. 1, is preferably of an improved design, as shown in FIG. 2 and subsequent figures of the drawings. The preferred embodiment of the chlorine generator 8, as shown in FIG. 2, produces a higher yield of chlorine gas and has a substantially lower time period for start up before gas is generated.

In FIG. 2, chlorine generator 8 consists of a hollow container 14 having a removable cover 15 sealed in place and having an opening 16 for introduction of salt (NaCl), and openings 17 and 18 for introduction of water. Hollow container 14 is divided by a vertically extending wall 19 which has a window opening 20 in which there is positioned ion-permeable membrane 21 which conducts cations, e.g., Na+. Ion-permeable membrane 21 may be a suitable cation exchange, electrically conductive membrane of the type conventionally used in electrolytic cells provided with membrane separation of the anode and the cathode compartments. The preferred membranes are fluorinated polymers and preferably perfluorsulfonic acid polymers, preferably NAFION, manufactured by Dupont.

Wall member 19 including membrane 21 divides the interior of container 14 into an anode compartment 22 and a cathode compartment 23. A cathode 24 is positioned in cathode compartment 23 and connected by electric lead 25 to a point external to container 14. Electric cathode 26 is positioned in cathode compartment 22 and is connected by electric lead 27 to a point external to container 14. The apparatus is provided with a power supply, such as, a transformer 28 powered by 110 volt power source 29 and providing a 12 volt D.C. output connected to electric leads 25 and 27. An electrically neutral or uncharged electrode 30 is positioned in anode compartment 22 in a direct line between anode 26 and cathode 24 and adjacent to ion-permeable membrane 21. Electrode 30 is electrically neutral in the sense that it is not connected by lead wire to the electric circuit energizing the anode 26 and cathode 24 to effect electrolytic decomposition of a salt solution. Electrode 30 is called a neutral electrode and is neutral in the sense defined above although it may have a measurable potential relative to the anode 26 or cathode 24 when the electrolytic circuit is energized. Electrode 30 is also referred to in the art as a bipolar electrode.

Figure 3:
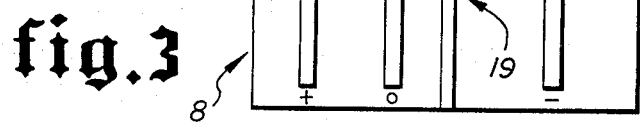
FIG. 3 is a plan view of the chlorine generator shown in FIG. 2.

In FIG. 3, which is a plan view of the chlorine generator 8, the plate-like construction of the various electrodes 24, 26, and 30 is seen. It has been found experimentally that better yields of chlorine are obtained by increasing the effective area of the anode. Thus, flat-plate electrodes are preferred in the chlorine generator of this invention although in some applications the cylindrical electrodes or other shape may be used. The cathode 24 is preferably a flat-plate of steel or the like. The anode 26 and the electrically neutral or bipolar electrode 30 are preferably flat-plates of carbon.

OPERATION

The chlorine generator described and shown in FIGS. 2 and 3 has been tested and found to be a substantial improvement over more conventional electrolytic chlorine generators.

In the chlorine generator shown, the cell is charged with water in both the anode compartment 22 and the cathode compartment 23 to a level above the top of the various electrodes but leaving a sufficient space at the top for the collection of gases. Common table salt (NaCl) was added to the water in the anode compartment. The ion-permeable membrane 21 in the cell was Dupont NAFION. Neutral element or bipolar electrode 30 was placed approximately one inch from the membrane. 12 volt D.C. were applied and monitored by a D.C. amp meter in the circuit.

The system was turned on. The current flow was 0.250 amp voltage readings of the solution were nearly constant throughout the anode compartment. This indicated that the anode compartment represented a single uniform resistance relative to the cathode. A potential difference between the anode and the neutral element was 0.9 volts D.C. There was immediate visible generation of hydrogen at the cathode. At this current level, there is a substantial lag in the production of chlorine. After a short period of time, however, chlorine begins to form at both the anode 26 and neutral or bipolar electrode 30. When the current is increased to about 10-11 amp for full production, there is vigorous generation of chlorine at the anode 26 and the neutral electrode 30. When operating at full voltage and full current, there is a substantial and measurable potential measured across the three electrodes in the cell. The neutral electrode 30 is at a potential of about 8 volts relative to the cathode. The potential in the brine in the anode compartment adjacent to ion-permeable membrane 21 is about 4 volts. The potential in the brine between the neutral electrode 30 and anode 26 is about 10 volts. Anode 26 is at a potential of 12 volts relative to cathode 24.

Under the conditions of operation described above, there is vigorous generation of hydrogen at cathode 24 and a rapid production of sodium hydroxide in cathode compartment 23. Sodium hydroxide is the natural product obtained when the sodium ions passing through ion-permeable membrane 21 are neutralized at cathode 24. The resulting product is sodium metal which is almost instantly converted into sodium hydroxide with evolution of hydrogen. At the same time, there is vigorous generation of chlorine in the anode compartment 22 at both the neutral or bipolar electrode 30 and the anode 26. The evolution of chlorine commences almost immediately as compared to a relatively long induction period for production of chlorine in conventional electrolytic chlorine generators.

In the start up of a chlorine generator, there is usually a substantial induction, or lag time which results from the low conductivity in the cathode compartment. Usually, the operation of the cell is relatively slow until sufficient sodium ions have been converted into sodium hydroxide at the cathode 24 and the caustic solution has reached a sufficient level of concentration to be highly electrically conductive. Likewise, in the anode compartment, there is usually an induction, or lag time resulting from the solubility of chlorine in water, particularly when the chlorine is generated slowly. In this improved chlorine generator there is a more rapid build up of sodium hydroxide in the cathode compartment as a result of the short distance that the sodium ions must travel from the neutral or bipolar electrode 30 to pass through ion-permeable membrane 21. Also, in this chlorine generator, the generation of chlorine at anode 26 and neutral electrode 30 is so vigorous that there is an almost immediate generation of chlorine gas from the cell. The productivity of this cell has been evaluated using the DPD colorimetric method of measuring residual chlorine in water. Data show that at worst cell operating conditions and no temperature problems production of 1 pound of chlorine per day was easily obtained at a current of 11 amp and only 5 gallons of brine solution. There was no long loss of time for start up and waiting for solutions to be concentrated with salt or caustic levels to rise. In conventional electrolytic chlorine generators this lag time in start up has often been days.

In experimental work carried out with this chlorine generator cell, a number of important observations were made. The resistance of the anode compartment is directly related to the distance of the anode to the cathode and the saturation of salt in the electrolytic solution. The production of chlorine at the anode and the neutral electrode and the production of hydrogen at the cathode are directly related to the surface area of these electrodes. The greater the area of anode surface (and of surface of neutral electrode) the more chlorine production occurs at a given current. The current flow however is limited by the resistance of the solution in the anode compartment and the rate of flow of sodium ions through ion-permeable membrane 21. The rate of flow of sodium ions through the membrane is also directly related to the caustic level of sodium hydroxide in the solution in cathode compartment 23 and is also related to the area of ion-permeable membrane 21.

By placing neutral or bipolar element 30 in the cell and locating the element in line between cathode 24 and anode 26 adjacent to ion-permeable membrane 21, substantial advantages are obtained. Neutral or bipolar electrode 30 acts as an anode relative to cathode 24 and also acts as a cathode relative to anode 26. In this manner, neutral or bipolar electrode 30 assists in effecting a rapid transfer of sodium ions to cathode compartment 23 and improves the rate of build up of caustic in that compartment. It also functions to improve the chlorine output and to reduce the induction period or start up time for the cell.

Tests carried out with this equipment using 6"×12" cathode, 6"×12"×2" anode, 6"×12"×2" neutral or bipolar electrode and a 2½"×8" ion-permeable membrane has shown that once the cell is saturated with salt a high chlorine output can be maintained with a small membrane area being used efficiently. It has been found that the optimum size for the ion-permeable membrane 21 is an area not substantially greater than the area required to conduct the maximum current used in the chlorine generator cell. The cathode 24, anode 26 and neutral or bipolar electrode 30 are preferably about the same surface area. Some difference in surface area may be used in certain specialized applications as will be described in connection with certain of the alternate embodiments of this invention.

The removal of chlorine and hydrogen and of caustic solution form the chlorine generator cell 8 is shown schematically, as is the introduction of water and table salt to the generator. Specific construction involves conventional structure in electrolytic cells and in gas recovery from such cells. Cell structures of the type shown in almost any of the patents referred to above can be used in production of a chlorine generator and in accordance with this invention provided that the neutral electrode is added and ion-permeable membrane is used as described. The collection of hydrogen and of chlorine may involve simple gas collection apparatus and may, if desired, involve the use of systems for mixing the hydrogen and chlorine gas with water for introduction into a body of water as described in connection with FIG. 1 above. Also, the equipment can be used in association with timers or in connection with flow controlling switches or controls or in connection with pressure responsive switches and controls as described in any of the patents listed above.

ALTERNATE EMBODIMENTS

In FIG. 4 to 10 there are shown a number of alternate embodiments of the chlorine generator shown in FIGS. 2 and 3. In these views, the chlorine generator is shown in plan view as in FIG. 3 and is illustrated in a variety of forms using different arrangements of neutral or bipolar electrodes and/or different configurations of electrodes.

Figure 4:
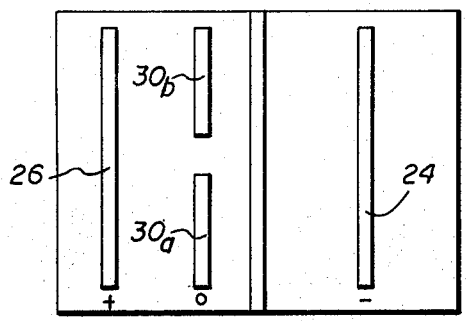
FIG. 4 is a plan view of another embodiment of chlorine generator having a plurality of neutral or bipolar electrodes.

In FIG. 4, the chlorine generator 8 has anode 26 and cathode 24 as in FIGS. 2 and 3. Neutral electrode 30, however, is provided as two separate electrodes 30a and 30b. When the circuit is energized, chlorine production occurs at anode 26 and at neutral or bipolar electrodes 30a and 30b.

Figure 5:
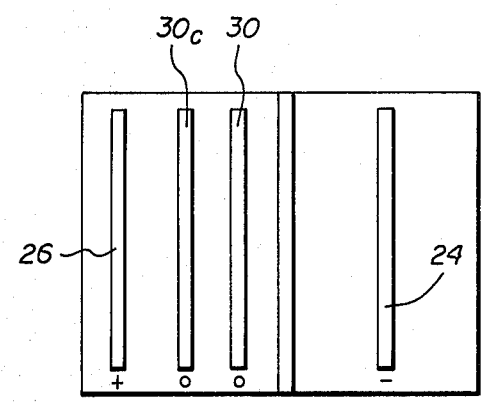
FIG. 5 is a plan view of another embodiment of chlorine generator having a plurality of neutral or bipolar electrodes aligned in series.

In FIG. 5, chlorine generator 8 has cathode 24 and anode 26 as in FIGS. 2 and 3. In this embodiment, neutral or bipolar electrode 30 is positioned adjacent to the ion-permeable membrane and a second neutral or bipolar electrode 30c is positioned between the electrode 30 and anode 26. When circuit is energized, chlorine production occurs at anode 26 and at each of the neutral or bipolar electrodes 30 and 30c.

Figure 6:
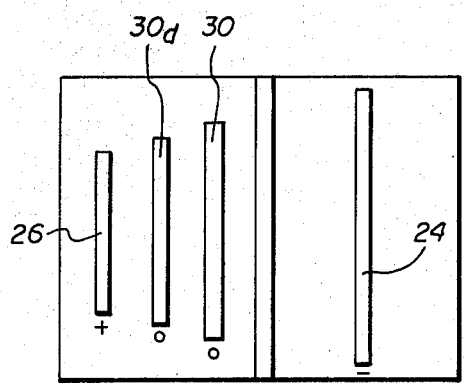
FIG. 6 is a plan view of still another embodiment of chlorine generator having a plurality of neutral or bipolar electrodes and an anode of diminishing size.

In FIG. 6, chlorine generator 8 has an anode 26 which is appreciably smaller in area than cathode 24. Neutral or bipolar electrodes 30 and 30d are graduated in size between the large size or cathode 24 and the small size of cathode 26.

Figure 7:
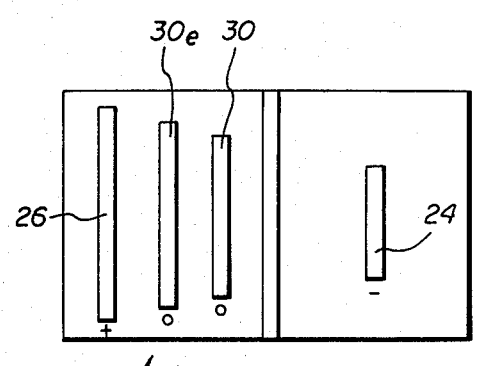
FIG. 7 is a plan view of still another embodiment of chlorine generator having a plurality of neutral or bipolar electrodes and an anode of increasing size.

In FIG. 7, chlorine generator 8 has a cathode 24 of relatively small size and anode 26 of substantially larger size. Neutral or bipolar electrodes 30 and 30e are graduated in size.

Figure 8:
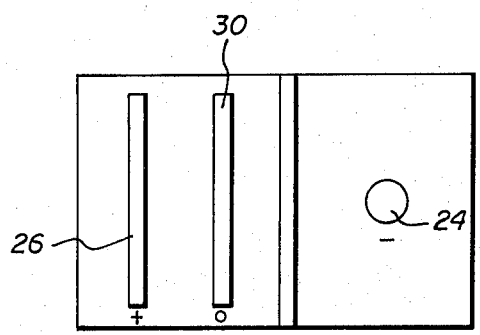
FIG. 8 is a plan view of still another embodiment of chlorine generator having a cylindrical cathode and flat plate electrodes and an anode.

In FIG. 8, chlorine generator 8 is substantially the same as that shown in FIG. 3, except that cathode 24 is a cylindrical rod.

Figure 9:
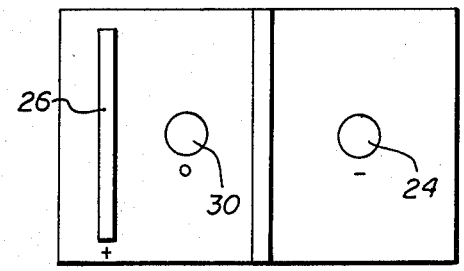
FIG. 9 is a plan view of still another embodiment of chlorine generator in which the cathode and the neutral or bipolar electrode are cylindrical.

In FIG. 9, chlorine generator 8 has a cylindrical rod cathode 24 a flat-plate anode 26 and a cylindrical rod neutral electrode 30.

Figure 10:
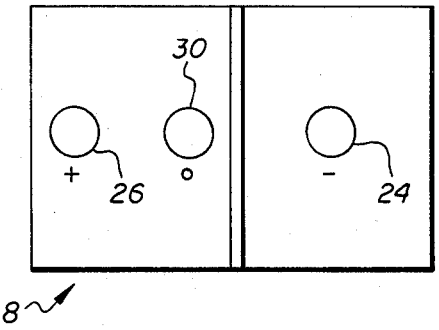
FIG. 10 is a plan view of still another embodiment of chlorine generator in which the cathode, anode and neutral or bipolar electrode are all cylindrical in shape.

In FIG. 10, chlorine generator 8 has cathode 24, anode 26 and neutral or bipolar electrode 30 all in the form of cylindrical rods. In each of these cases, the cylindrical rod cathode is of a metal such as stainless steel and the anode 26 and neutral or bipolar electrode 30 are preferably of carbon either in the form of a flat-plate or cylindrical rod as shown.

In the several embodiments having multiple neutral electrodes 30, viz. FIG. 4, FIG. 5, FIG. 6, and FIG. 7, the chlorine generation takes place at the anode 26 and at each of the separate neutral electrodes. A plurality of neutral or bipolar electrodes, two or more, may be used as desired. Chlorine generation takes place at each of the electrodes and the anode. In the embodiment shown in FIG. 6 the current flow is focused from a large cathode 24 through sequentially smaller neutral electrodes 30 and 30d to a smaller anode 26 to provide a higher current density. The reverse effect is obtained in FIG. 7 where the graduated neutral or bipolar electrodes 30 and 30e focus a high current from a small cathode 26 on to a larger anode 26. The embodiments in FIGS. 8, 9 and 10 illustrate the effect of substitution of cylindrical electrodes in the chlorine generator cell.

Figure 11:
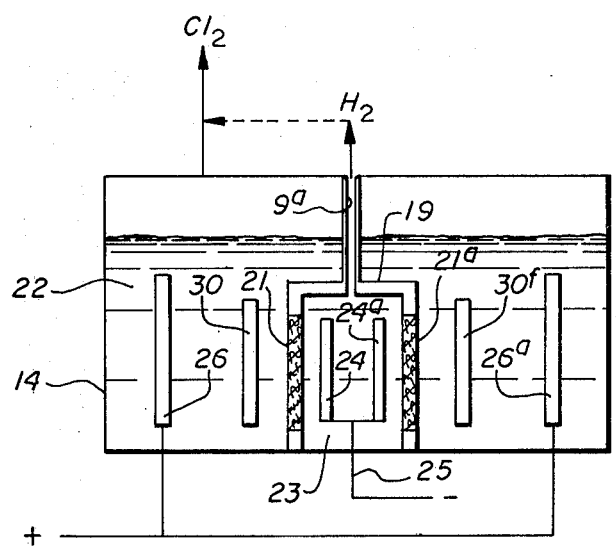
FIG. 11 is a schematic view, in elevation, of still another embodiment of chlorine generator having a pair of cathodes and a pair of anodes.

In FIG. 11, there is shown still a further embodiment of the invention in the form of a double cell. Chlorine generator 8 consists of hollow container 14 having wall 19 completely enclosing the cathode chamber 23. A pair of ion-permeable membranes 21 and 21a are positioned on opposite sides of wall 19. A pair of cathodes 24 and 24a are provided in cathode compartment 23 and are connected to the electric circuit by lead 25. A conduit 9a leads from the end wall portion of wall 19 to conduct hydrogen from cathode compartment 23.

Anode compartment 22 completely surrounds wall 19 and the liquid level completely covers cathode chamber 23. A pair of anodes 26 and 26a are provided. A pair of neutral or bipolar electrodes 30 and 30f are provided and positioned in direct line between the respective cathodes and anodes and adjacent to the ion-permeable membrane. Chlorine is produced from each of the anodes 26 and 26a and the neutral or bipolar electrodes 30 and 30f and hydrogen and caustic are produced in cathode chamber 23. The operation of this chlorine generator cell is the same as the other embodiments, except that the number of electrodes is doubled.

Figure 12:
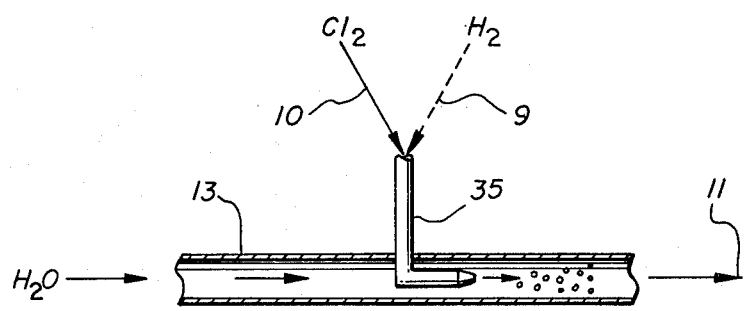
FIG. 12 is a schematic view of one apparatus for introduction of chlorine or mixture of chlorine and hydrogen to a stream of water leading to the venturi mixer in the chlorination system shown in FIG. 1.

The output of chlorine and hydrogen from the cell in FIG. 11 or in any of the other embodiments may be supplied as a gas directly to the mixer 7 in the system of FIG. 1 or may be introduced into a stream of flowing water indicated schematically at 13 in FIG. 1. The structure required for introducing gases hydrogen and chlorine into water stream 13 is illustrated in FIG. 12 where there is shown conduit 13 and an injection tube 35 through which chlorine (and optionally hydrogen) is passed and introduced into a stream of flowing water for introduction into venturi mixer 7 as indicated at 11.

While this invention has been described fully and completely with emphasis upon several preferred embodiments it should be understood that within the scope of the attended claims the invention may be practiced otherwise than as specifically described herein.

I claim:
1. A chlorine generator comprising
   a hollow container having a wall dividing the same into a first and a second compartment,
   said wall including an ion-permeable membrane permitting flow of cations therethrough,
   an anode positioned in said first compartment,
   a cathode positioned in said second compartment,
   a bipolar electrode positioned in said first compartment, in line between said anode and said cathode and adjacent to said ion-permeable membrane,
   said bipolar electrode being of a size and shape permitting free circulation of electrolyte therearound and being exposed on all sides to the same aqueous electrolyte,
   said generator being adapted to be substantially filled with water in both of said compartments and to have sodium chloride added to said first compartment and to have said anode and said cathode connected in a direct current electric circuit, said anode and said cathode being operable when energized to produce hydrogen at said cathode and chlorine at said anode and at said bipolar electrode, and means forming outlets from said first and said second compartment for conducting chlorine and hydrogen therefrom.

2. A chlorine generator according to claim 1 in which all of said electrodes are of equal surface area.

3. A chlorine generator according to claim 1 in which at least one of said electrodes has a surface which is different from another of the electrodes.

4. A chlorine generator according to claim 1 in which there are a plurality of said bipolar electrodes positioned between said anode and said ion-permeable membrane.

5. A chlorine generator according to claim 1 in which at least one of said electrodes is a flat plate.

6. A chlorine generator according to claim 1 in which at least one of said electrodes is cylindrical.

7. A chlorine generator according to claim 1 in which said ion-permeable membrane comprises only part of said wall.

8. A chlorine generator according to claim 1 in which said wall surrounds said second compartment and said first compartment surrounds said wall.

9. A chlorine generator according to claim 8 in which said wall includes a pair of oppositely positioned ion-permeable membranes, two cathodes being positioned in said second compartment aligned with said membranes, two bipolar electrodes being positioned in said first compartment, each being positioned between one of said anodes and the adjacent ion-permeable membrane.

10. A chlorine generator according to claim 1 in which said ion-permeable membrane has an area not substantially greater than the area required to transport sodium ions at the maxiumu rate of electrolysis when said anode and said cathode are energized.

11. A chlorine generator according to claim 1 in which said outlet means includes means to collect and mix the chlorine and hydrogen produced.

12. A chlorine generator according to claim 1 in which said container includes openings for introduction of water and sodium chloride and openings for removal of sodium hydroxide and of hydrogen and chlorine gasses.

13. A chlorine generator according to claim 1 in which said ion-permeable membrane comprises a perflurosulfonic acid polymer.

14. A chlorinating system comprising a conduit for conducting water, gas-water mixing means positioned in said conduit for flow of water therethrough, a chlorine generator connected to said mixing means to introduce chlorine thereto, and comprising a hollow container having a wall dividing the same into a first and a second compartment, said wall including an ion-permeable membrane permitting flow of cations therethrough, an anode positioned in said first compartment, a cathode positioned in said second compartment, a bipolar electrode positioned in said first compartment, in line between said anode and said cathode and adjacent to said ion-permeable membrane, said bipolar electrode being of a size and shape permitting free circulation of electrolyte therearound and being exposed on all sides to the same aqueous electrolyte, all of said electrodes are of equal surface area, said generator being adapted to be substantially filled with water in both of said compartments and to have sodium chloride added to said first compartment and to have said anode and said cathode connected in a direct current electric circuit, said anode and said cathode being operable when energized to produce hydrogen at said cathode and chlorine at said anode and at said bipolar electrode, and means forming outlets from said first and said second compartments for conducting chlorine and hydrogen therefrom.

15. A chlorinating system according to claim 14 in which said outlet means are interconnected to admix chlorine and hydrogen prior to introduction of said chlorine to said mixing means.

16. A chlorinating system according to claim 14 in which said outlet means includes conduit means for conducting water and mixing chlorine therewith, and said conduit means being connected to said mixing means to supply a mixture of water and chlorine thereto.

17. A method for chlorinating a body of water which comprises providing a chlorine generator comprising a hollow container having a wall dividing the same into two compartments and including an ion-permeable membrane permitting flow of cations therethrough, a cathode in one of said compartments, an anode in the other of said compartments, a bipolar electrode in said other compartment positioned between said anode and said membrane, said bipolar electrode being of a size and shape permitting free circulation of electrolyte therearound and being exposed on all sides to the same aqueous electrolyte, providing water to said cathode compartment, providing a water solution of sodium chloride to said anode compartment to surround said anode and said bipolar electrode, passing a predetermined amount of direct current through said water and said sodium chloride solution to produce chlorine at said anode and said bipolar electrode and to produce hydrogen and sodium hydroxide at said cathode, collecting said chlorine, and mixing said chlorine at a predetermined rate with part of said body of water and returning the resulting mixture to said body of water.

* * * * *